United States Patent
Booth et al.

(10) Patent No.: US 10,894,490 B2
(45) Date of Patent: Jan. 19, 2021

(54) FOLDABLE RESTRAINT RELEASABLY ATTACHED TO A MAIN SUPPORT STRUCTURE OF A VEHICLE

(71) Applicant: GM Global Technology Operations LLC, Detroit, MI (US)

(72) Inventors: Daniel W. Booth, Troy, MI (US); Michael G. Schuplin, Jr., Grand Blanc, MI (US); Samuel Derian, Detroit, MI (US); Sarah E. Smith, Harrison Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 100 days.

(21) Appl. No.: 16/168,344

(22) Filed: Oct. 23, 2018

(65) Prior Publication Data

US 2020/0122609 A1  Apr. 23, 2020

(51) Int. Cl.
*B60N 2/28* (2006.01)
*B60R 22/12* (2006.01)
*B60R 22/10* (2006.01)

(52) U.S. Cl.
CPC .............. *B60N 2/28* (2013.01); *B60R 22/105* (2013.01); *B60R 22/12* (2013.01)

(58) Field of Classification Search
CPC .......... B60N 2/28; B60R 22/105; B60R 22/12
USPC ................................................. 297/253, 255
See application file for complete search history.

(56) References Cited

U.S. PATENT DOCUMENTS

| | | | |
|---|---|---|---|
| 3,713,695 A | 1/1973 | Von Wimmersperg | |
| 6,601,916 B1* | 8/2003 | Kamiki | B60N 2/2812 297/250.1 |
| 6,692,072 B2* | 2/2004 | Nelson | A47D 1/103 297/129 |
| 6,932,429 B2* | 8/2005 | Kamiki | B60N 2/2812 297/255 |
| 7,374,241 B2* | 5/2008 | Gold | A47D 1/02 297/255 X |

FOREIGN PATENT DOCUMENTS

DE   102005010434 A1   9/2006
EP        1429644 A1   6/2004

* cited by examiner

*Primary Examiner* — Anthony D Barfield

(57) ABSTRACT

A foldable restraint for a seat of a vehicle is disclosed and includes a body. The body includes a bottom side, a back side, and a spine connecting the bottom side and the back side to one another. The bottom side and the back side are configured to rotate towards one another to fold the foldable restraint into a stowed position and the bottom side and the back side rotate away from one another and into a deployed position. The foldable restraint also includes one or more upper engagement mechanisms connected to the back side of the foldable restraint and configured to releasably attach to a support structure of the seat of the vehicle. The foldable restraint also includes one or more lower engagement mechanisms connected to the seat side of the foldable restraint and configured to releasably attach to a support structure of the seat of the vehicle.

17 Claims, 9 Drawing Sheets

FOLDABLE RESTRAINT RELEASABLY ATTACHED TO A MAIN SUPPORT STRUCTURE OF A VEHICLE

INTRODUCTION

The present disclosure relates to a foldable restraint for a vehicle. More specifically, the present disclosure relates to a foldable restraint configured to fold from a deployed position and into a stowed position, which is releasably attached to a main support structure of a vehicle.

Many individuals use mobile computing devices such as smartphones to locate car-for-hire or ride-sharing services. However, the vehicles used in these types of car-for-hire or ride-sharing services typically do not include a child restraint or safety seat to accommodate a small child such as a toddler. As a result, when individuals ride in one of these vehicles they need to provide their own child safety seat in the event a small child accompanies them. In addition to vehicles used for ride-sharing services, individuals may also need to provide their own child safety seat when accompanied by a child when riding in a fleet vehicle. Fleet vehicles are part of a group of vehicles all owned by a common organization, such as a business or a government agency.

Child safety seats are large and bulky, which makes it inconvenient for individuals to carry these seats from place to place. Furthermore, many individuals struggle or find it time-consuming to properly install a child safety seat in a vehicle. Most ride-sharing services do not include a child seat in their vehicle, since child seats occupy an entire seat that could be used to accommodate an adult instead. As a result, it is inconvenient for individuals to use ride-sharing services when accompanied by small children.

Thus, while current child safety seats achieve their intended purpose, there is a need for a new and improved system and method for a child safety seat for vehicles used in ride-sharing and fleet services.

SUMMARY

According to several aspects, a foldable restraint for a seat of a vehicle is disclosed. The foldable restraint includes a body, and the body includes a bottom side, a back side, and a spine connecting the bottom side and the back side to one another. The bottom side and the back side are configured to rotate towards one another to fold the foldable restraint into a stowed position and the bottom and back rotate away from one another and into a deployed position. The foldable restraint also includes one or more upper engagement mechanisms connected to the back side of the foldable restraint and configured to releasably attach to a support structure of the seat of the vehicle. The foldable restraint further includes one or more lower engagement mechanisms connected to the seat side of the foldable restraint and configured to releasably attach to a support structure of the seat of the vehicle.

In another aspect of the disclosure, the body is constructed of a non-rigid material configured to elastically deform in response to a load being exerted on the body.

In yet another aspect of the disclosure, the non-rigid material is selected from the group consisting of: foam, webbing, netting, woven thread, ductile resin, and malleable soft touch resin.

In still another aspect of the disclosure, the foldable restraint further comprises one or more upper straps, where one of the upper attachment mechanisms is slidably engaged with a corresponding upper strap.

In another aspect of the disclosure, the corresponding upper strap connects the corresponding upper attachment mechanism to the back side of the foldable restraint.

In yet another aspect of the disclosure, the foldable restraint further comprises one or more lower straps, where one of the lower attachment mechanisms is slidably engaged with a corresponding lower strap.

In still another aspect of the disclosure, the corresponding lower strap connects the corresponding lower attachment mechanism to the seat side of the foldable restraint.

In another aspect of the disclosure, the foldable restraint is a child foldable restraint, and the body of the foldable restraint is shaped as either a booster seat or a child safety seat.

In yet another aspect of the disclosure, the foldable restraint further comprises a netting releasably engaged with the foldable restraint. The netting is configured to provide support to an occupant when the foldable restraint is in the deployed position.

In still another aspect of the disclosure, the foldable restraint is sized to be accommodated by a storage space located within the seat when in the stowed position.

In one aspect, a foldable restraint for a seat of a vehicle is disclosed. The foldable restraint includes a body constructed of a non-rigid material configured to elastically deform in response to a load being exerted on the body. The body includes a bottom side, a back side, and a spine connecting the bottom side and the back side to one another. The bottom side and the back side are configured to rotate towards one another to fold the foldable restraint into a stowed position and the bottom side and the back side rotate away from one another and into a deployed position. The foldable restraint also includes one or more upper engagement mechanisms connected to the back side of the foldable restraint and configured to releasably attach to a support structure of the seat of the vehicle. The foldable restraint further includes one or more lower engagement mechanisms connected to the seat side of the foldable restraint and configured to releasably attach to the support structure of the seat of the vehicle.

In another aspect of the disclosure, the foldable restraint further comprises one or more upper straps, where one of the upper attachment mechanisms is slidably engaged with a corresponding upper strap.

In yet another aspect of the disclosure, the corresponding upper strap connects the corresponding upper attachment mechanism to the back side of the foldable restraint.

In still another aspect of the disclosure, the foldable restraint further comprises one or more lower straps, where one of the lower attachment mechanisms is slidably engaged with a corresponding lower strap.

In another aspect of the disclosure, the corresponding lower strap connects the corresponding lower attachment mechanism to the seat side of the foldable restraint.

In yet another aspect of the disclosure, the foldable restraint is a child foldable restraint, and the body of the foldable restraint is shaped as either a booster seat or a child safety seat.

In still another aspect of the disclosure, the foldable restraint further comprises a netting releasably engaged with the foldable restraint.

In another aspect of the disclosure, the netting is configured to provide support to an occupant when the foldable restraint is in the deployed position.

In still another aspect of the disclosure, the foldable restraint is sized to be accommodated by a storage space located within the seat when in the stowed position.

In one aspect, a foldable restraint for a seat of an automobile is disclosed. The foldable restraint includes a body constructed of a non-rigid material configured to elastically deform in response to a load being exerted on the body. The body is shaped as either a booster seat or a child safety seat. The body includes a bottom side, a back side, and a spine rotatably connecting the bottom side and the back side to one another. The bottom side and the back side are configured to rotate towards one another to fold the foldable restraint into a stowed position and the bottom side and the back side rotate away from one another and into a deployed position. The foldable restraint is sized to be accommodated by a storage space located within the seat when in the stowed position. The foldable restraint includes one or more upper engagement mechanisms connected to the back side of the foldable restraint and configured to releasably attach to a support structure of the seat of the automobile. The foldable restraint also includes one or more lower engagement mechanisms connected to the seat side of the foldable restraint and configured to releasably attach to the support structure of the seat of the automobile.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
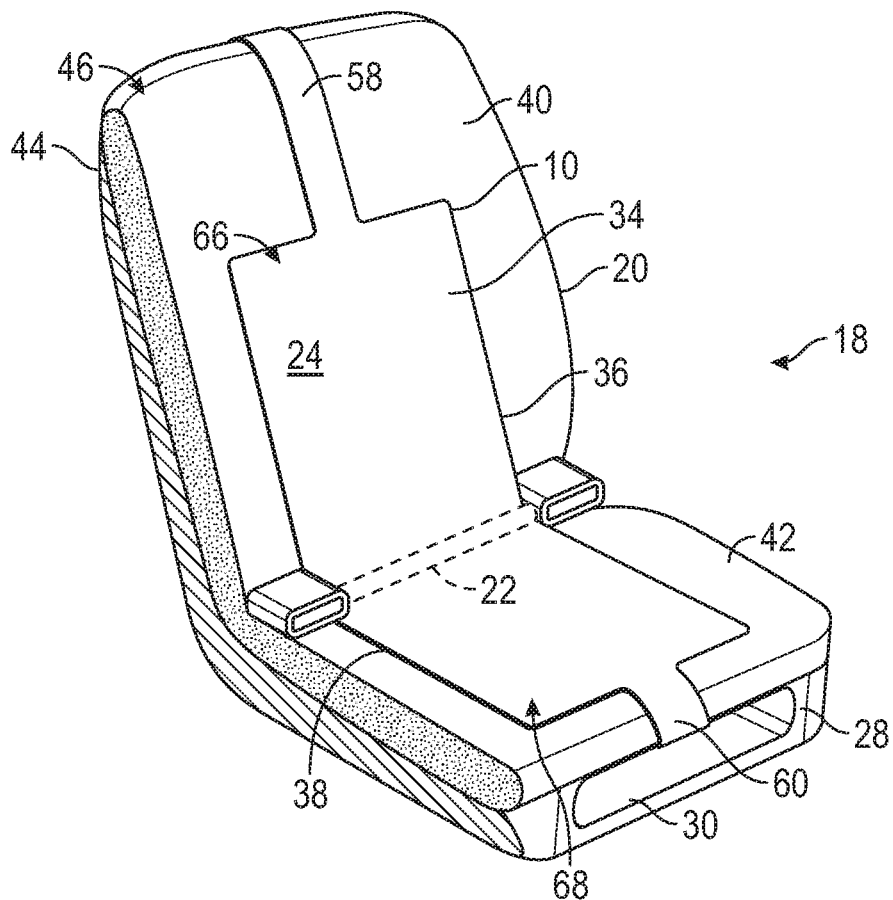
FIG. 1 is a perspective view of the disclosed foldable restraint in a deployed position, where the foldable restraint is releasably attached to a seat of a vehicle according to an exemplary embodiment.
Figure 2:
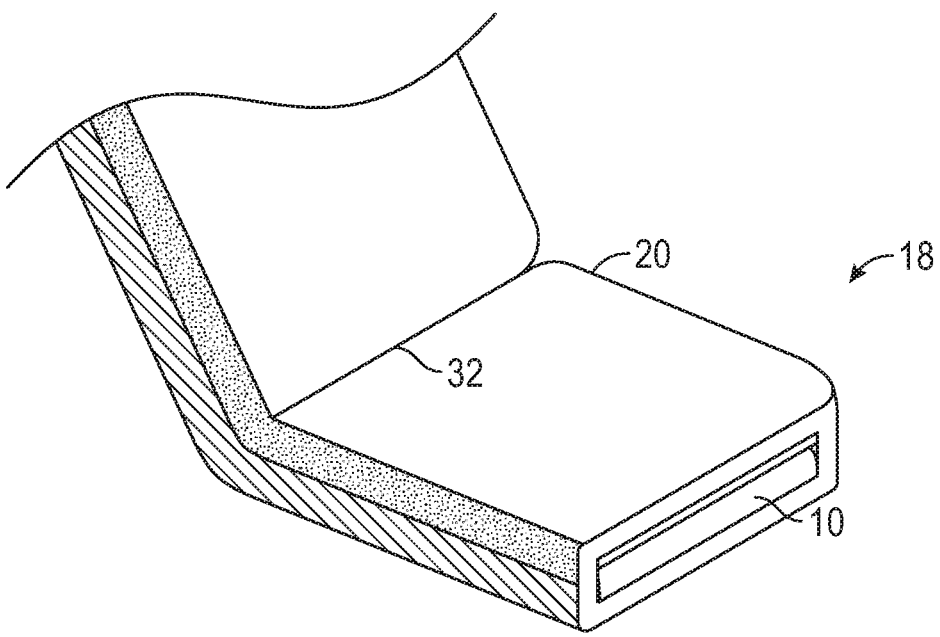
FIG. 2 is an illustration of the foldable restraint folded into a stowed position and stored in a compartment that is part of the seat according to an exemplary embodiment.

Referring to FIG. 1, a foldable restraint 10 for a seat 20 of a vehicle 18 is shown. The foldable restraint 10 is illustrated in FIG. 1 in an in-use position, which is referred to as a deployed position. When in the deployed position, the foldable restraint 10 is rotated about a spine 22 to reveal or expose an inside surface 24. A child may be seated on the inside surface 24 the foldable restraint 10. However, when the foldable restraint 10 is not in use or is no longer needed, the foldable restraint 10 is configured to fold along the spine 22 and into a compact configuration, which is referred to as a stowed position. In the non-limiting embodiment as shown in FIG. 2, the foldable restraint 10 is stored in a cavity shaped to accommodate the foldable restraint 10 when in the stowed position, which is referred to as a compartment 30.

When folded into the stowed position, the foldable restraint 10 is sized to be accommodated by a storage space located within the seat 20 of the vehicle 18. As shown in FIG. 2, the storage space is the compartment 30, which is located in a base 28 the seat 20. However, it is to be appreciated that FIG. 2 is merely one embodiment of a storage configuration, and the foldable restraint 10 may be stored in other locations within the vehicle 18 as well. As explained in greater detail below, in an alternative embodiment the foldable restraint 10 is received by a bight line 32 (seen in FIG. 8) in the seat 20 when in the stowed position.

The foldable restraint 10 may no longer occupy space on the seat 20 once folded and placed in the stowed position. Instead, the empty space on the seat 20 may be used to seat a passenger. For example, once the foldable restraint 10 is no longer needed, an operator (e.g., the child's parent, the driver of the vehicle 18, or another adult) may fold the foldable restraint 10 into the stowed position. When the foldable restraint 10 is stowed, this creates space on the seat 20 for another passenger. The foldable restraint 10 is configured to fold about the spine 22 from the stowed position and into the deployed position, where the foldable restraint 10 is now available for access by an operator. Similarly, when the foldable restraint 10 is no longer needed, the foldable restraint 10 is configured to fold about the spine 22 from the deployed position and back into the stowed position, where the foldable restraint 10 is no longer accessible by the operator.

The foldable restraint 10 is a child foldable restraint. A child is an individual who has not outgrown the internal harness or height limitations of a forward-facing child safety seat (e.g., between about 40 to 80 pounds and under about four feet nine inches). Moreover, in one embodiment the vehicle 18 is an automobile such as a car, van, or sport utility vehicle. However, it is to be appreciated that the vehicle 18 may be any device for transporting passengers and is not limited to automobiles. For example, in another embodiment the vehicle 18 may be an aircraft.

Figure 3:
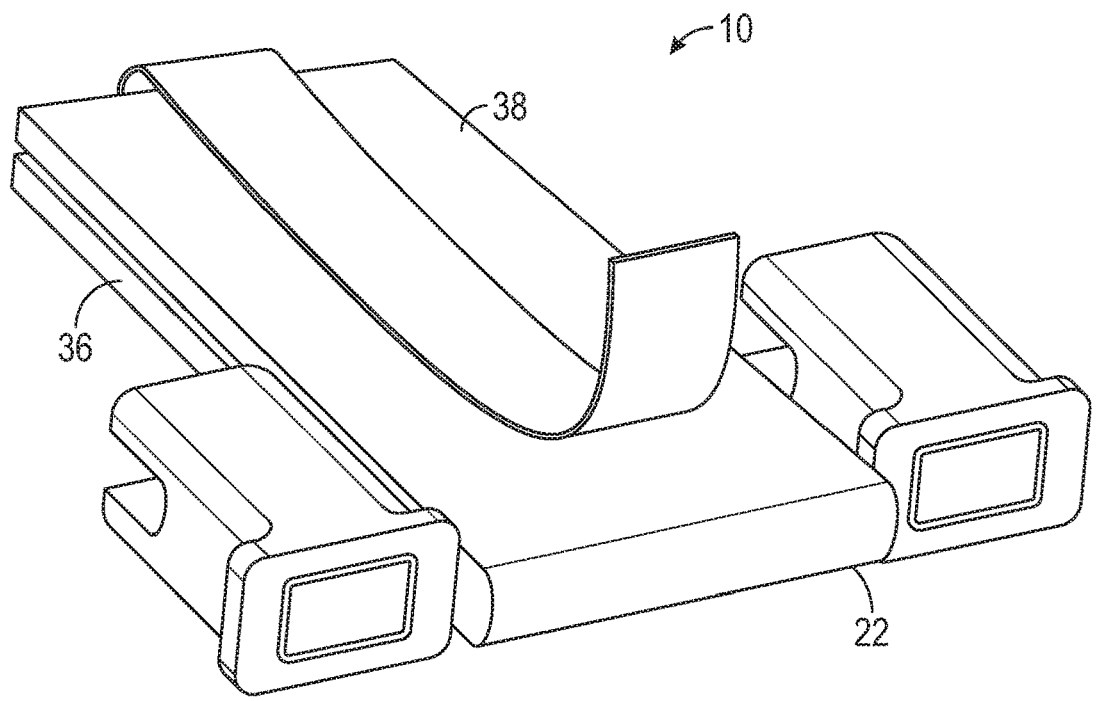
FIG. 3 is an illustration of the foldable restraint immediately after being removed from the compartment in the seat according to an exemplary embodiment.

Referring to FIG. 1, a body 34 of the foldable restraint 10 includes a back side 36, a seat side 38, and the spine 22 that connects the back side 36 and the seat side 38 to one another. The body 34 of the foldable restraint 10 is shaped as either a booster seat or a child safety seat. The inside surface 24 of the foldable restraint 10 is exposed when the foldable restraint 10 is in the deployed position. The foldable restraint 10 is configured to fold into the stowed position by rotating the back side 36 and the seat side 38 towards one another along the spine 22. FIG. 3 is an illustration of the foldable restraint 10 immediately after being removed from the compartment 30 in the seat 20 (FIG. 1), where the foldable restraint 10 is still in the stowed position. In the exemplary embodiment as shown in FIG. 3, both the back side 36 and the seat side 38 are oriented in a substantially horizontal position and are also parallel with respect to one another when the foldable restraint 10 is in the stowed position. However, it is to be appreciated that in another embodiment, the back side 36 and the seat side 38 may not be oriented horizontally in the stowed position. Furthermore, it is also to be appreciated that the back side 36 and the seat side 38 may not be parallel to one another in the stowed position as well.

Referring back to FIG. 1, an operator may unfold the foldable restraint 10 from the stowed position and into the deployed position by rotating the back side 36 and the seat side 38 away from one another along the spine 22. In one exemplary embodiment, the back side 36 and the seat side 38 continue to rotate about the spine 22 until the back side 36 of the foldable restraint 10 abuts against a back 40 of the seat 20 and the bottom side 38 of the foldable restraint 10 abuts against the bottom 42 of the seat 20. In other words, the foldable restraint 10 is configured to unfold about the spine 22 of the seat 20 and into the deployed or in-use position. Accordingly, in one embodiment, the foldable restraint 10 may also be referred to as a clamshell style seat that includes two halves (i.e., the back side 36 and the seat side 38) rotatably joined together at a spine or hinge.

The body 34 of the foldable restraint 10 is constructed at least in part by one or more non-rigid materials. A non-rigid material is configured to elastically deform in response to a load being exerted on the body 34. More specifically, the non-rigid material is configured to elastically deform in response to a load exerted upon the foldable restraint 10 when a small child is placed or seated on the foldable restraint 10. It is to be appreciated that when the child is seated, the foldable restraint 10 is in the deployed position. Some examples of non-rigid materials that provide sufficient flexibility for the foldable restraint 10 include, but are not limited to, foam, webbing, netting, woven thread, ductile resin, or malleable soft touch resin. In one embodiment, the non-rigid material is covered by a fabric cover. In some embodiments, the foldable restraint 10 may include a rigid frame (not shown). The frame may be constructed of a metal such as, for example, a high strength aircraft grade aluminum, however other materials may be used as well. The rigid frame provides strength and rigidity to the body 34 of the foldable restraint 10.

Figure 4:
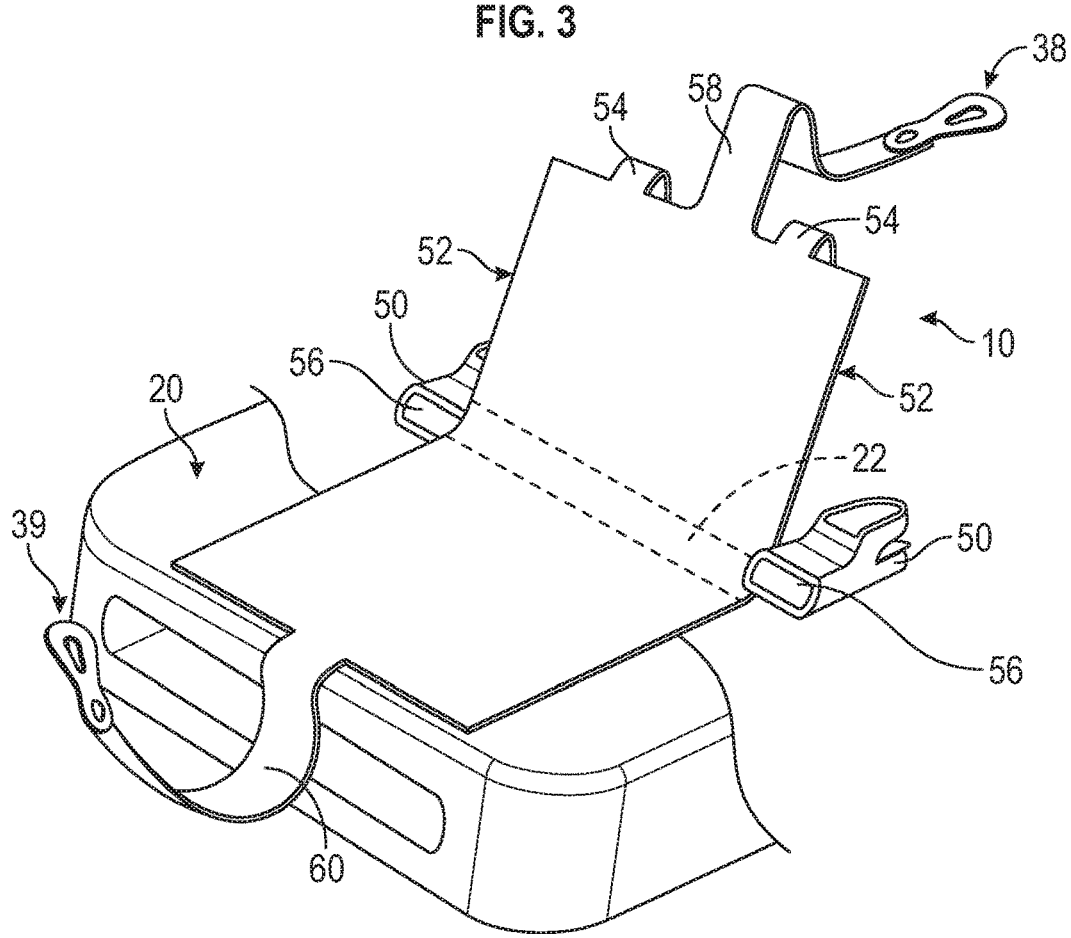
FIG. 4 is a perspective view of the foldable restraint in the deployed position according to an exemplary embodiment.

Referring to FIG. 4, the foldable restraint 10 is releasably attached to the seat 20 of the vehicle 18 (the seat 20 is visible in FIG. 1). The foldable restraint 10 includes one or more upper attachment mechanisms 38 and one or more lower attachment mechanisms 39. In the embodiment as illustrated, the foldable restraint 10 includes an upper attachment mechanism 38 connected to the back side 36 of the foldable restraint 10 and is configured to releasably attach to a frame or support structure (not shown in FIG. 4) of the seat 20 of the vehicle 18. Similarly, the foldable restraint 10 may also include a lower attachment mechanism 39 connected to the seat side 38 of the foldable restraint 10 is configured to releasably attach to the support structure of the seat 20 of the vehicle 18. In the non-limiting embodiment as shown in FIG. 3, the upper attachment mechanism 38 is a connecter configured to releasably attach to a bracket (not visible) located along a rearmost surface 44 of the seat 20 (FIG. 1). In one embodiment, the connecter 42 is configured to releasably attach to an ISOFIX bracket (not visible) located along the rearmost surface 44 of the seat 20. However, it is to be appreciated that the bracket of the seat 20 is not limited to being placed along the rearmost surface 44 of the seat 20. For example, in an alternative embodiment the bracket may be placed along a top portion 46 of the seat 20 instead.

The lower attachment mechanism 39 is also a connector configured to releasably attach to a bracket (not visible) located underneath the seat 20. In one embodiment, the lower attachment mechanism 39 is also configured to releasably attach to an ISOFIX bracket as well. Moreover, although FIG. 4 only illustrates a single lower attachment mechanism 39, in another embodiment one or more lower attachment mechanisms 39 may be provided instead.

The foldable restraint 10 also includes one or more upper straps 58 and one or more lower straps 60 for positioning the corresponding attachment mechanisms 38, 40. In the embodiment as shown, the upper attachment mechanism 38 is positioned along the upper strap 58 and the lower attachment mechanism 39 is positioned along the lower strap 60. Specifically, the upper attachment mechanism 38 is slidably engaged with the upper strap and the lower attachment mechanism 39 is slidably engaged with the lower strap 60. The upper strap 58 is connected to an upper portion 66 of the back side 36 of the seat 20. The upper portion 66 of the back seat 36 is where an occupant's head may rest once seated within the foldable restraint 10. The lower strap 60 is integrated or connected to a lower portion 68 of the bottom side 38 of the foldable restraint 10. Alternatively, in another embodiment, the lower strap 60 may be integrated with the seat 20 or the vehicle 18. The lower portion 68 of the bottom side 38 is where an occupant's knees or feet may rest once seated within the foldable restraint 10.

The upper strap 58 and the lower strap 60 are constructed of a material configured to withstand loads that are exerted upon the foldable restraint 10 by the occupant during operation of the vehicle 18. Specifically, the loads exerted upon the foldable restraint 10 are created by the occupant during a sudden deceleration or stop of the vehicle 18. For example, in the event the vehicle 18 is an automobile, then the restraint material is configured to withstand loads that are experienced by passenger as the automobile is driven. Similarly, if the vehicle 18 is an aircraft, then the restraint material is configured to withstand loads that are experienced by a passenger during flight. For example, in one embodiment the upper strap 58 and the lower strap 60 are constructed of a seat belt webbing.

The foldable restraint 10 may also include one or more connectors configured to releasably attach to a corresponding bracket or other attachment mechanism located along the bight line 32 (seen in FIG. 2) of the seat 20. In the embodiment as shown in FIGS. 1 and 4, the foldable restraint 10 includes a pair of connectors 50 positioned on opposing sides 52 of the foldable restraint 10, where the connectors 50 are aligned with the spine 22 and are positioned to releasably attach with a corresponding connector (not visible in the figures) located along the bight line 32 of the seat 20 (seen in FIG. 2). For example, in one non-limiting embodiment the connectors 50 are configured to releasably attach to a corresponding ISOFIX bracket located along the bight line 32. In an embodiment, the connectors 50 both include respective release buttons 56 configured to detach the connectors 50 from the brackets of the seat 20. It is to be appreciated that the connectors 50 may be any attachment mechanism configured to releasably attach to a corresponding connector located in the bight line 32 of the seat 20. For example, in another embodiment the connectors 50 are hook attachments.

The upper attachment mechanism 38, the lower attachment mechanism 39, and the connectors 50 of the foldable restraint 10 are each attached to a bracket of the seat 20. It is to be appreciated that the brackets are all attached to a frame or other structural support of the seat 20 (the brackets and the structural support of the seat are not shown in the drawings). The structural support of the seat 20 is attached to a body or main support structure of the vehicle 18 (the main support structure of the vehicle 18 is not visible in the figures). Accordingly, the foldable restraint 10 is releasably attached to the main support structure of the vehicle 18.

Figure 5:
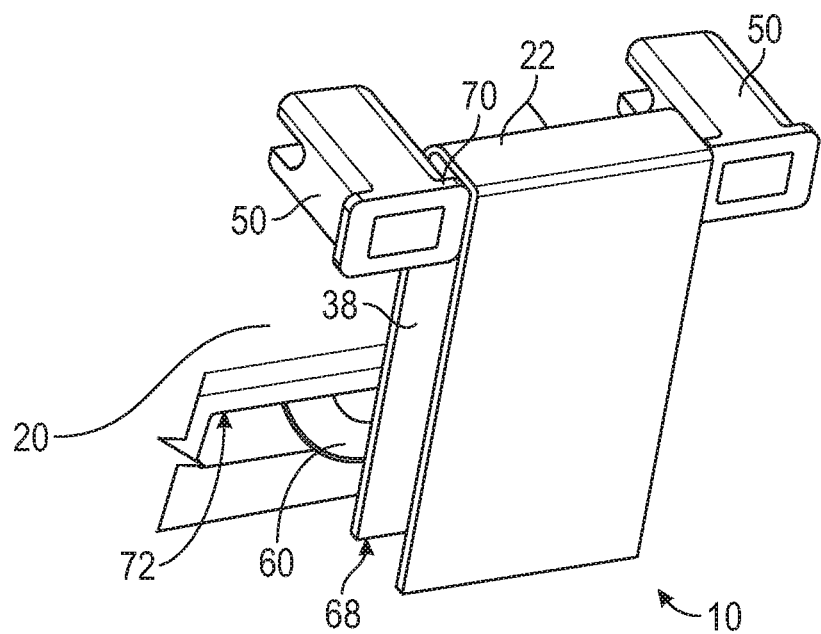
FIG. 5 illustrates the foldable restraint hanging along a bar after being removed from the compartment in the seat according to an exemplary embodiment.
Figure 6:
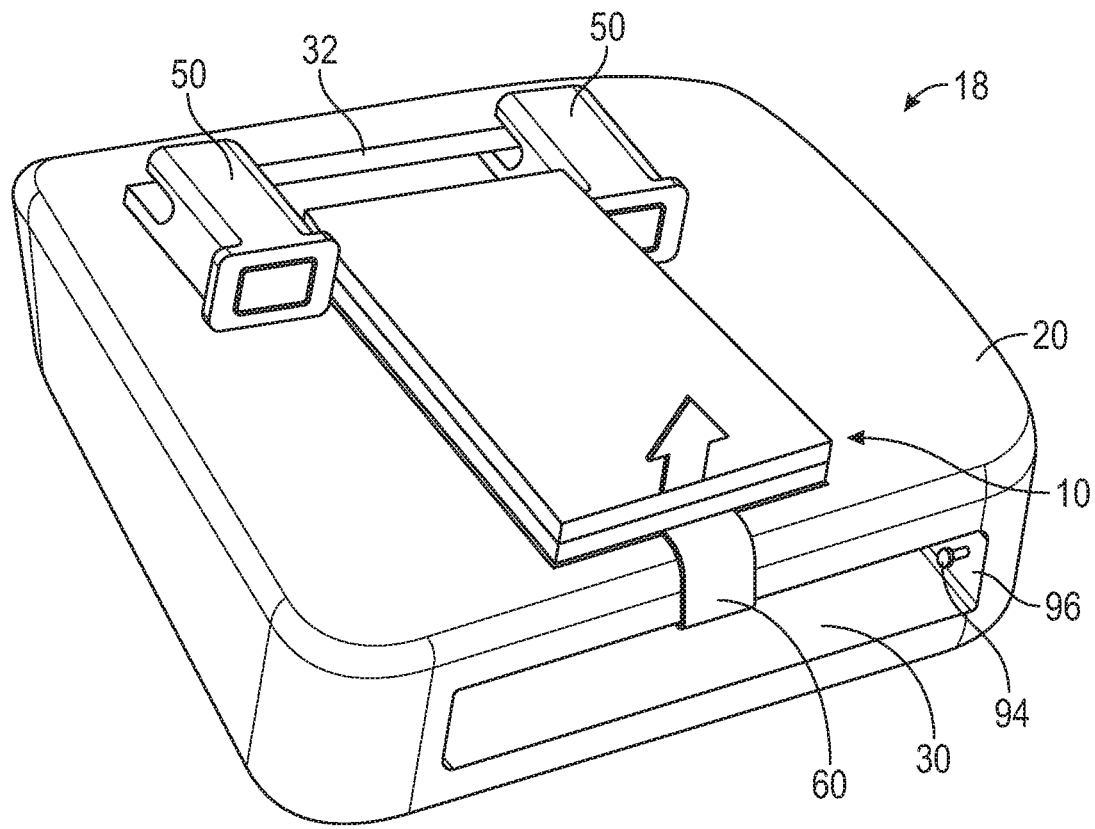
FIG. 6 illustrates the foldable restraint seen in FIG. 5 placed upon the seat of the vehicle according to an exemplary embodiment.
Figure 7:
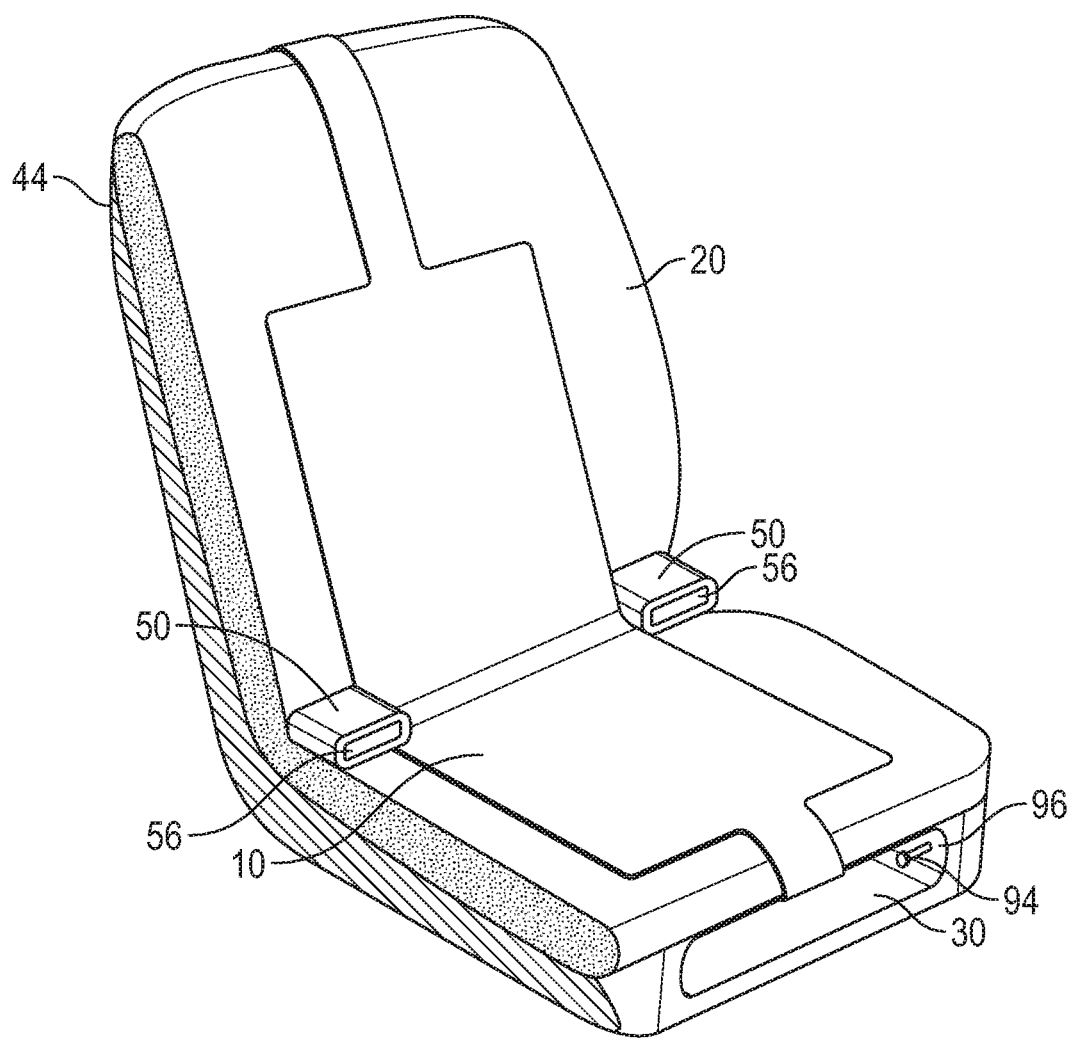
FIG. 7 illustrates the foldable restraint shown in FIG. 6 unfolded into the deployed position.

FIGS. 5, 6, and 7 illustrate the foldable restraint 10 being unfolded from the stowed position (seen in FIG. 3) and into the deployed position (seen in FIG. 7). Referring now to FIGS. 3 and 5, the foldable restraint 10 is removed from the compartment 30 in the seat 20 (FIG. 1). The spine 22 of the foldable restraint 10 is positioned across a bar 70 (FIG. 5). The bar 70 extends between and attaches both of the connectors 50 of the foldable restraint 10 to one another. The foldable restraint 10 rotates about the spine 22 from the position as seen in FIG. 1 and into the position as seen in FIG. 5 due to gravitational force. The foldable restraint 10 also rotates because the lower strap 60 is integrated or connected to the lower portion 68 of the bottom side 38 of the foldable restraint 10, and the lower strap 60 is attached to a bottom area 72 of the seat 20. The spine 22 of the foldable restraint 10 now hangs across the bar 70.

An operator may then place the hanging foldable restraint 10 seen in FIG. 5 upon the seat 20 of the vehicle 18, and into the position shown in FIG. 6. The connectors 50 of the foldable restraint 10 then releasable attach to corresponding brackets (not visible) locate in the bight line 32 of the seat 20. Then, the operator may then unfold the foldable restraint 10 into the deployed position seen in FIG. 7. The upper attachment mechanism 38 (seen in FIG. 3) is then releasably attached to a corresponding bracket (not visible in the figures) located on the rearmost surface 44 of the seat 20. Referring to both FIGS. 6 and 7, in one embodiment a pair of retention pins 94 are positioned of side surfaces 96 of the compartment 30 (only one of the retention pins 94 are visible). When the foldable restraint 10 is placed back into the compartment 30, the connectors 50 each affix to one of the retention pins 94, thereby securing the foldable restraint 10 in place the stowed position.

Figure 8:
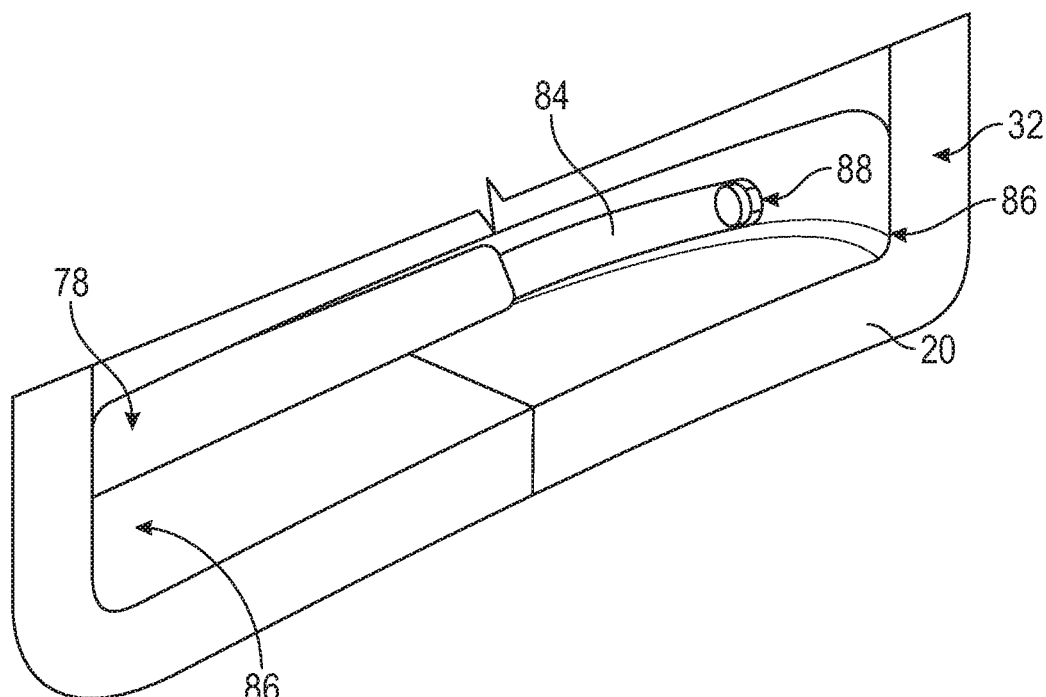
FIG. 8 illustrates a compartment located in the bight line of the seat according to an exemplary embodiment.
Figure 9:
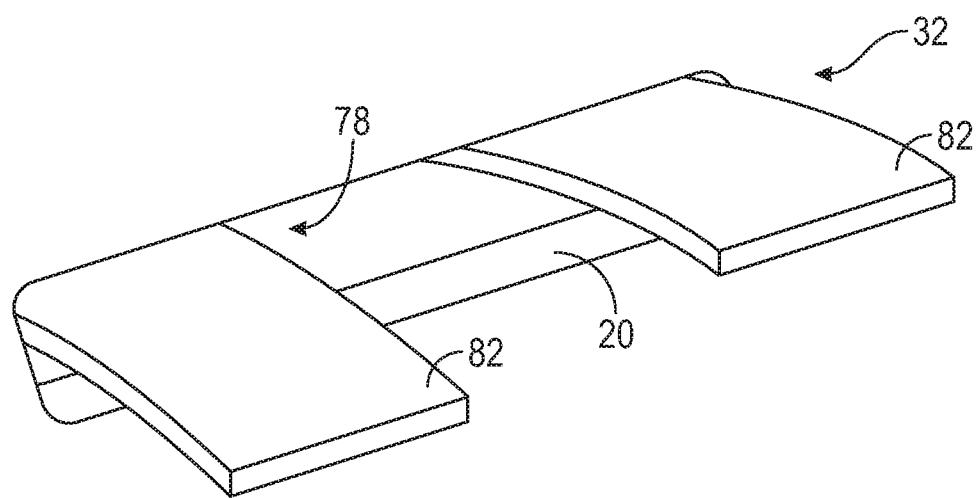
FIG. 9 illustrates the bight line in FIG. 8, where a pair of straps extend from the compartment and are used to remove the foldable restraint from the compartment according to an exemplary embodiment.

It is to be appreciated that the foldable restraint 10 may be placed into the stowed position using a variety of different approaches. For example, FIG. 8 illustrates the bight line 32 of the seat 20, where a volume or compartment 78 is defined within an interior portion 80 of the seat 20. The compartment 78 is sized or shaped to accommodate the foldable restraint 10 (not shown in FIG. 8) when folded into the stowed position. Referring to FIGS. 8 and 9, in one embodiment the foldable restraint 10 may be removed from the compartment 78 by pulling on one or more straps 82 that are located outside of the bight line 32. However, in an alternative embodiment, the foldable restraint 10 may be removed based on a slidable track configuration. Specifically, referring to FIG. 8, the compartment 78 defines two tracks 84 (only one track 84 is visible). The tracks 84 are disposed along opposing sides 86 of the compartment 78 and are shaped to slidingly receive a corresponding pin 88. The pin 88 is configured to slide back and forth in a linear motion along a corresponding one of the tracks 84.

Figure 10:
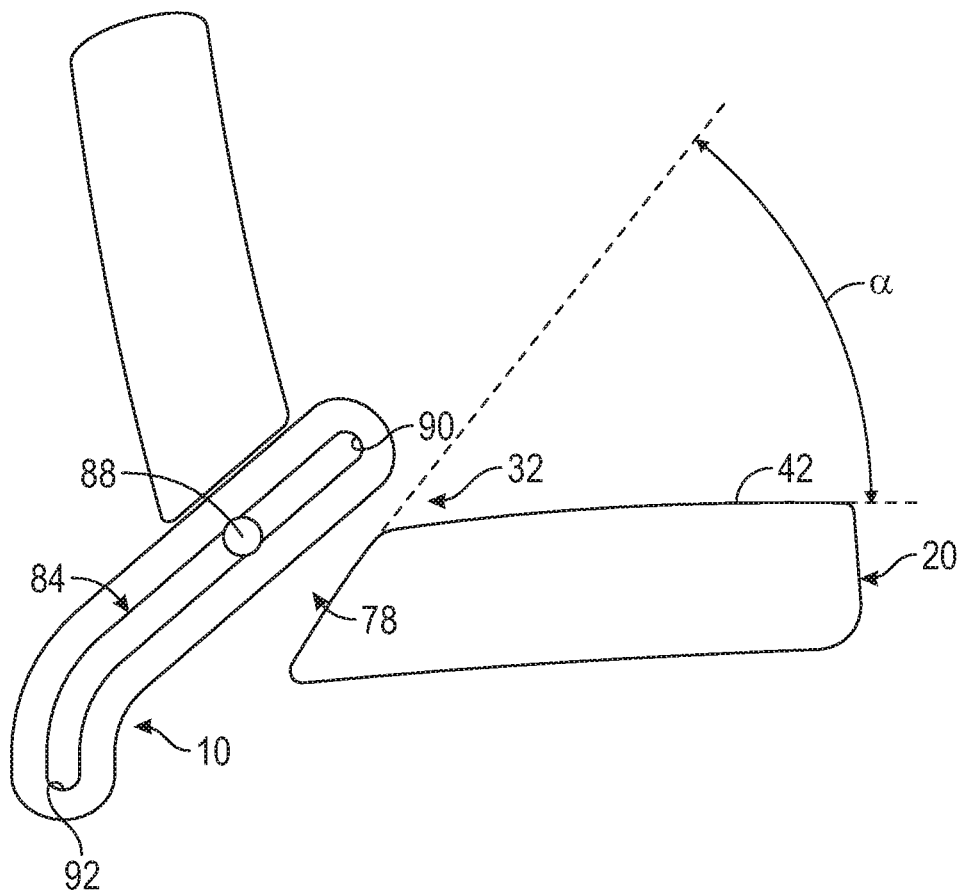
FIG. 10 is a side schematic view of the seat and the bight line shown in FIG. 8, where the foldable restraint is being rotated out of the stowed position according to an exemplary embodiment.
Figure 11:
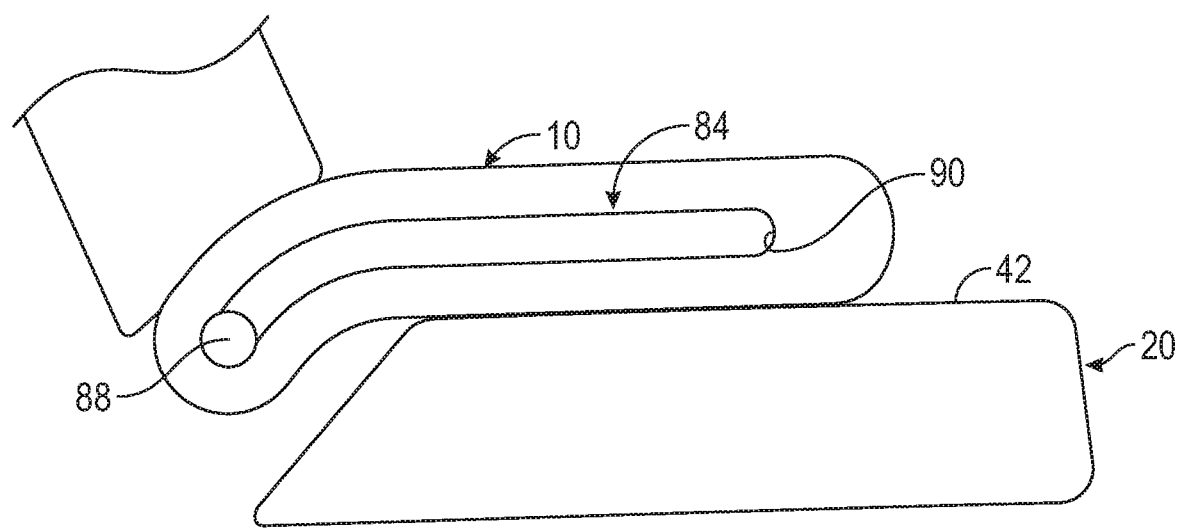
FIG. 11 is a side schematic view of the seat and the foldable restraint in the deployed position.

FIGS. 10 and 11 are schematic side views of the foldable restraint 10 being removed from the compartment 78 in the bight line 32 of the seat 20. Referring now to FIGS. 8, 10, and 11, the pins 88 located along both tracks 84 are also engaged with the foldable restraint 10. The compartment 78 is oriented at an angle α relative to the bottom 42 of the seat 20. As an operator pulls the foldable restraint 10 out of the compartment 78 of the bight line 32, the pins 88 travel from a first end 90 of a corresponding one of the tracks 84 and to a second end 92 of the track 84. Once the pins 88 are located at the second end of the respective tracks 84, the foldable restraint 10 rests upon the bottom 42 of the seat 20.

Figure 12:
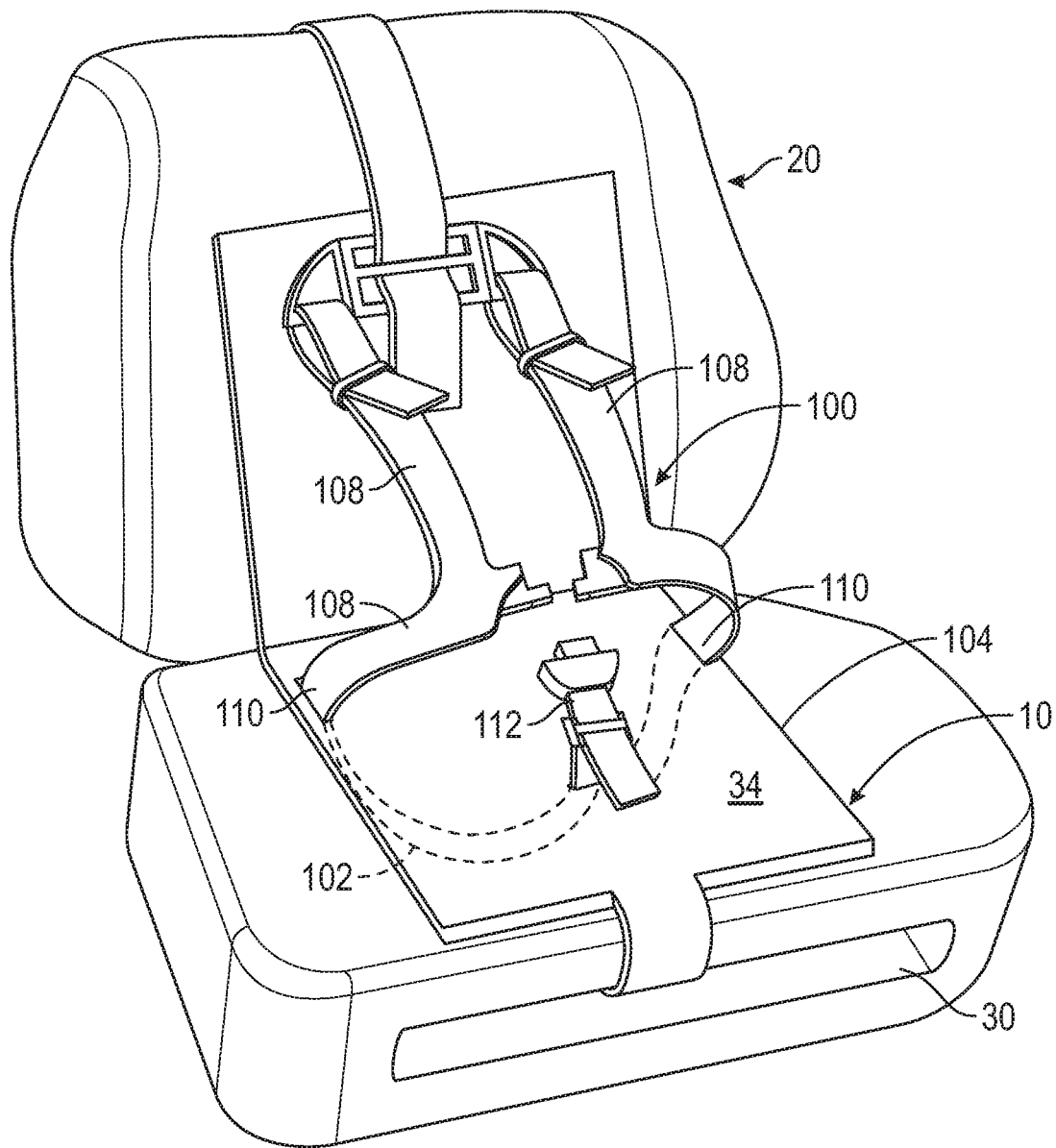
FIG. 12 is an illustration of the foldable restraint and a harness according to an exemplary embodiment.

Referring now to FIG. 12, in one embodiment the foldable restraint 10 also includes a harness 100. The harness 100 is configured to secure an occupant in place within the foldable restraint 10. In the embodiment as shown in FIG. 12, the harness 100 is a five-point harness including a groin strap 112, however it is to be appreciate that other types of harnesses for securing an occupant may be used as well. A portion 102 of the harness 100 may be integrated or is placed within the body 34 of the foldable restraint 10 (the portion 102 is shown in phantom line). In one embodiment, the foldable restraint 10 may include an elastic edge (not shown) disposed around an outer periphery or edge 104 of the body 34. Thus, the straps 108 of the harness 100 may not fall out or get in the way of an operator as the foldable restraint 10 is folded and unfolded. In another approach, portions 110 of the straps 108 adjacent to the body 34 of the foldable restraint 10 may include elastic (not shown) that is woven or otherwise integrated with the straps 108. The elastic is configured to bias or urge the straps 108 away from the outer edge 104 of the body 34 of the foldable restraint 10.

Figure 13A:
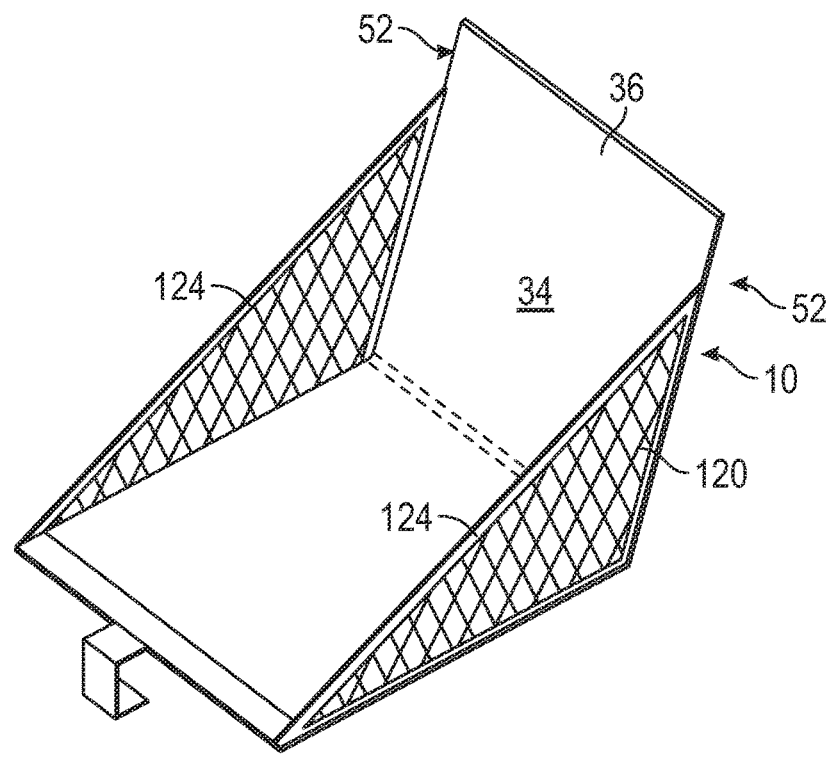
FIGS. 13A-13C illustrate a deployable netting for securing an occupant of the foldable restraint in place in place according to an exemplary embodiment.
Figure 13B:
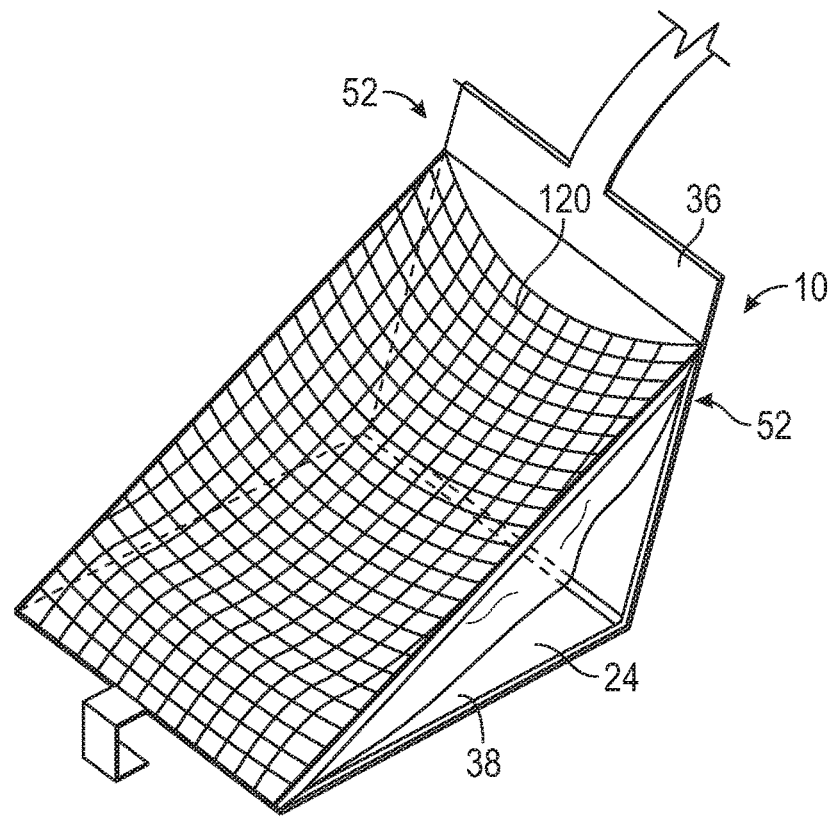
Figure 13C:
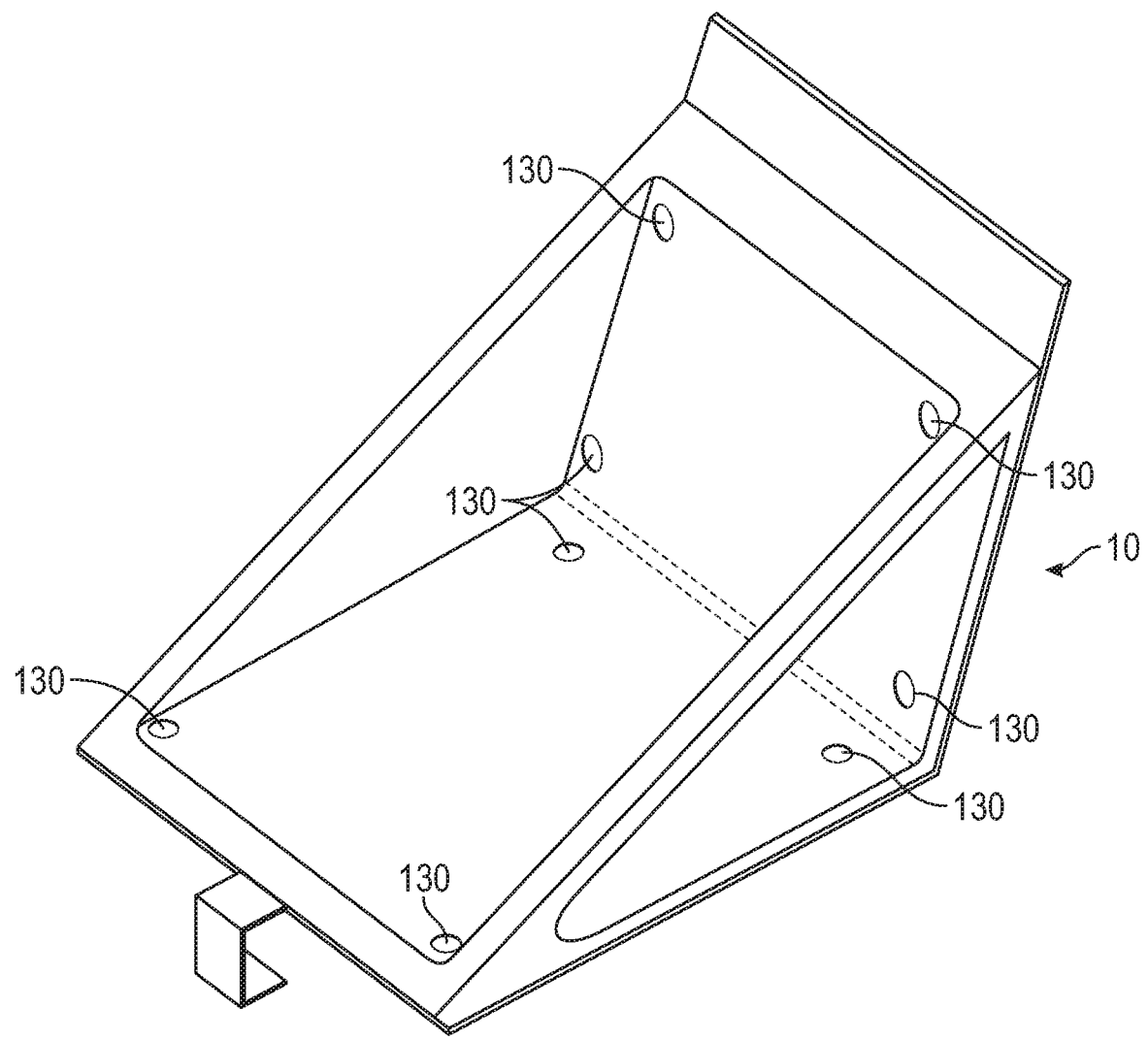

In yet another embodiment, the foldable restraint 10 may include deployable netting. FIGS. 13A, 13B, and 13C illustrate a netting 120 that is releasably engaged with the foldable restraint 10 and is configured to provide support to the occupant when the foldable restraint 10 is in the deployed position. In the embodiment as shown in FIG. 13A, a pair of support rails 124 are disposed on the opposing sides 52 of the foldable restraint 10. In one embodiment, the support rails 124 provide rigidity to the seat back 36. The netting 120 is disposed on the opposing sides 52 of the foldable restraint 10. Specifically, the netting 120 extends between the body 34 of the foldable restraint 10 and a corresponding one of the support rails 124. In the embodiment as shown in FIG. 13A, the netting 120 provides side support to an occupant of the foldable restraint 10.

In another embodiment as shown in FIG. 13B, the netting 120 is not only disposed at the opposing sides 52 of the foldable restraint 10, but also covers the inside surface 24 of the foldable restraint 10 as well. Accordingly, the netting 120 provides complete support to the body of an occupant. Referring to both FIGS. 13B and 13C, in one approach the foldable restraint 10 includes a plurality of attachment points 130 configured to releasably engage with a corresponding attachment on the netting 120. In this way, the overall profile or shape of the netting may be changed to accommodate an occupant. For example, the netting 120 may be adjusted to position a smaller child to that they may recline (i.e., where the seat bottom 38 is tilted and the seat back 36 is reclined.

Referring generally to the figures, the disclosed foldable restraint provides support to a child in the vehicle when needed, and folds into the stowed position when no longer needed. The foldable restraint is constructed of a non-rigid material and is used as either a booster seat to accommodate larger children or a child safety seat to accommodate smaller children. The foldable restraint is configured to fold from the deployed position and into the stowed position. When in the stowed position, the foldable restraint no longer occupies space on the seat. Instead, the empty space on the seat may be used to seat a passenger. Furthermore, the foldable restraint is releasably attached to the support structure of the seat. Thus, if the foldable restraint is no longer needed, the foldable restraint may be removed from the vehicle with relative ease.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A foldable restraint for a seat of a vehicle, the foldable restraint comprising:
    a body, comprising:
        a bottom side and a back side; and
        a spine connecting the bottom side and the back side to one another, wherein the bottom side and the back side are configured to rotate towards one another to fold the foldable restraint into a stowed position and the bottom and back rotate away from one another and into a deployed position, wherein the spine extends horizontally from opposing sides of the body;
    a pair of connectors connected to the opposing sides of the body and in alignment with the spine, the pair of connectors configured to releasably attach to a support structure of the seat;
    one or more upper engagement mechanisms connected to the back side of the foldable restraint and configured to releasably attach to a support structure of the seat of the vehicle; and
    one or more lower engagement mechanisms connected to the seat side of the foldable restraint and configured to releasably attach to a support structure of the seat of the vehicle.

2. The foldable restraint of claim 1, wherein the body is constructed of a non-rigid material configured to elastically deform in response to a load being exerted on the body.

3. The foldable restraint of claim 2, wherein the non-rigid material is selected from the group consisting of: foam, webbing, netting, woven thread, ductile resin, and malleable soft touch resin.

4. The foldable restraint of claim 1, further comprising one or more upper straps, wherein one of the upper attachment mechanisms is slidably engaged with a corresponding upper strap.

5. The foldable restraint of claim 4, wherein the corresponding upper strap connects the corresponding upper attachment mechanism to the back side of the foldable restraint.

6. The foldable restraint of claim 1, further comprising one or more lower straps, wherein one of the lower attachment mechanisms is slidably engaged with a corresponding lower strap.

7. The foldable restraint of claim 6, wherein the corresponding lower strap connects the corresponding lower attachment mechanism to the seat side of the foldable restraint.

8. The foldable restraint of claim 1, wherein the foldable restraint is a child foldable restraint, and the body of the foldable restraint is shaped as either a booster seat or a child safety seat.

9. The foldable restraint of claim 1, wherein the foldable restraint is sized to be accommodated by a storage space located within the seat when in the stowed position.

10. A foldable restraint for a seat of a vehicle, the foldable restraint comprising:
    a body constructed of a non-rigid material configured to elastically deform in response to a load being exerted on the body, the body comprising:
        a bottom side and a back side; and
        a spine connecting the bottom side and the back side to one another, wherein the bottom side and the back side are configured to rotate towards one another to fold the foldable restraint into a stowed position and the bottom side and the back side rotate away from one another and into a deployed position, and wherein the spine extends horizontally from opposing sides of the body;
    a pair of connectors connected to the opposing sides of the body and in alignment with the spine, the pair of connectors configured to releasably attach to a support structure of the seat;
    one or more upper engagement mechanisms connected to the back side of the foldable restraint and configured to releasably attach to a support structure of the seat of the vehicle; and
    one or more lower engagement mechanisms connected to the seat side of the foldable restraint and configured to releasably attach to the support structure of the seat of the vehicle.

11. The foldable restraint of claim 10, further comprising one or more upper straps, wherein one of the upper attachment mechanisms is slidably engaged with a corresponding upper strap.

12. The foldable restraint of claim 11, wherein the corresponding upper strap connects the corresponding upper attachment mechanism to the back side of the foldable restraint.

13. The foldable restraint of claim 10, further comprising one or more lower straps, wherein one of the lower attachment mechanisms is slidably engaged with a corresponding lower strap.

14. The foldable restraint of claim 13, wherein the corresponding lower strap connects the corresponding lower attachment mechanism to the seat side of the foldable restraint.

15. The foldable restraint of claim 10, wherein the foldable restraint is a child foldable restraint, and the body of the foldable restraint is shaped as either a booster seat or a child safety seat.

16. The foldable restraint of claim 10, wherein the foldable restraint is sized to be accommodated by a storage space located within the seat when in the stowed position.

17. A foldable restraint for a seat of an automobile, the foldable restraint comprising:
    a body constructed of a non-rigid material configured to elastically deform in response to a load being exerted on the body, wherein the body is shaped as either a booster seat or a child safety seat, and wherein the body comprises:
        a bottom side and a back side; and
        a spine rotatably connecting the bottom side and the back side to one another, wherein the bottom side and the back side are configured to rotate towards one another to fold the foldable restraint into a stowed position and the bottom side and the back side rotate away from one another and into a deployed position, and wherein the foldable restraint is sized to be accommodated by a storage space located within the seat when in the stowed position, wherein the spine extends horizontally from opposing sides of the body;

a pair of connectors connected to the opposing sides of the body in alignment with the spine, the pair of connectors connected together by a bar that extends across the body, the pair of connectors configured to releasably attach to a support structure of the seat, and wherein the spine is positioned across the bar;

one or more upper engagement mechanisms connected to the back side of the foldable restraint and configured to releasably attach to a support structure of the seat of the automobile; and one or more lower engagement mechanisms connected to the seat side of the foldable restraint and configured to releasably attach to the support structure of the seat of the automobile.

\* \* \* \* \*